United States Patent [19]

Nozaki et al.

[11] Patent Number: 4,945,681
[45] Date of Patent: Aug. 7, 1990

[54] DOOR WEATHER STRIP FOR MOTOR VEHICLE

[75] Inventors: Masahiro Nozaki, Ama; Junji Asai, Nagakute, both of Japan

[73] Assignees: Toyoda Gosei Co., Ltd., Nishikasugai; Kabushiki Kaisha Toyoda Jidoshokki Seisakusho, Kariya, both of Japan

[21] Appl. No.: 354,295

[22] Filed: May 19, 1989

[30] Foreign Application Priority Data

May 20, 1988 [JP] Japan .............................. 63-67118[U]

[51] Int. Cl.$^5$ .............................................. E06B 7/16
[52] U.S. Cl. ........................................ 49/495; 49/488; 49/498
[58] Field of Search ................. 49/495, 498, 488, 497; 296/146

[56] References Cited

U.S. PATENT DOCUMENTS

| | | | |
|---|---|---|---|
| 3,706,628 | 12/1972 | Azzola | 49/495 X |
| 4,026,598 | 5/1977 | Koike | 49/495 X |
| 4,308,302 | 12/1981 | Etter et al. | 49/498 X |
| 4,381,115 | 4/1983 | Ko | 49/498 X |
| 4,769,947 | 9/1988 | Ogawa et al. | 49/498 X |

FOREIGN PATENT DOCUMENTS 57-188520 11/1982 Japan .

Primary Examiner—Philip C. Kannan
Attorney, Agent, or Firm—Cushman, Darby & Cushman

[57] ABSTRACT

A door weather strip to be attached along an outer periphery of a door frame of a motor vehicle has a base portion to be attached to an outer periphery of the door frame, and a tubular sealing portion formed integrally with the base portion. The tubular sealing portion is divided by a bridge connecting the base portion and an upper wall of the tubular sealing portion into an inside sealing portion and an outside sealing portion. An inner side wall of the inside sealing portion is pressed to a body surface around the door opening, and an upper wall of the outside sealing portion is pressed to a drip moulding protruding along a roof side of the vehicle body. The wall thickness of both the bridge and the upper wall of the inside sealing portion, which extends from an upper end of the bridge to the inner side wall is larger than that of the other portion of the sealing portion, whereby when the door is drawn outward during high speed running of the motor vehicle, a corner portion of the thick-walled bridge and upper wall of the inside sealing portion is pressed to the drip moulding, accordingly the sealing performance between the door weather strip and the drip moulding is increased.

6 Claims, 3 Drawing Sheets

DOOR WEATHER STRIP FOR MOTOR VEHICLE

BACKGROUND OF THE INVENTION

1. Field of the Invention

The present invention relates to a door weather strip attached along a door frame of a motor vehicle for effecting a seal between a door opening of the motor vehicle and the door frame.

2. Description of the Prior Art

The door weather strip is generally provided with a base portion to be attached to an outer periphery of the door frame, and a tubular sealing portion projecting integrally from the base portion. When a door is closed, an inner side wall of the sealing portion is pressed to a body surface formed around the door opening to effect a seal between the door opening and the door frame.

In order to further improve the sealing performance between the door frame and the door opening, it is desirable to provide a double sealing construction. One example of the double sealing construction is shown in Japanese Utility Model Laid-open No. Sho 57-188520, wherein a bridge is formed so as to cross an inner cavity of the sealing portion for dividing it into an inside sealing portion and an outside sealing portion. When the door is closed, an inner side wall of the inside sealing portion is pressed to the body surface around the door opening while an upper wall of the outside sealing portion comes into contact with another body surface projecting along a roof side thereby effecting a double seal between the door opening and the door frame.

Meanwhile, during high speed running of a motor vehicle, an upper portion of the door is drawn outward to cause the decrease in sealing performance of the door weather strip. In order to overcome this problem, various means have been proposed, but these means are encountered by another problem that the construction becomes too complex.

SUMMARY OF THE INVENTION

It is an object of the present invention to provide a door weather strip for effecting a double seal between a door opening and a door frame by a simple construction and maintaining good sealing performance at the time the door is drawn outward.

According to the present invention, the door weather strip is provided with a base portion to be attached to an outer periphery of a door frame of a motor vehicle, and a tubular sealing portion formed integrally with the base portion and projecting therefrom upward. The tubular sealing portion is divided by a bridge connecting the base portion and an upper wall of the tubular sealing portion into an inside seaing portion and an outside sealing portion. An inner side wall of the inside sealing portion is pressed to a body surface around a door opening, and an upper wall of the outside sealing portion is pressed to another body surface such as a drip moulding protruding along a roof side of the vehicle body. The wall thickness of both the bridge and the upper wall of the inside sealing portion, which extends from an upper end of the bridge to the inner side wall of the inside sealing portions is larger than that of the other portion of the sealing portion.

When the door is closed, the inner side wall of the inside sealing portion is pressed to the body surface. And the resultant reaction force of the body surface is transmitted to the upper end of the bridge through the undeformable thick-walled upper wall of the inside sealing portion whereby the bridge is inclined outward. This results in the thin-walled upper wall of the outside sealing portion being upward deformed so as to come into contact with the drip moulding. Thus, the door weather strip of the present invention can effect a double seal in both the inner side surface of the inside sealing portion and the upper wall of the outside sealing portion.

When the door is drawn outward, the door frame is drawn in a direction perpendicular to the glass surface obliquely inclining upward. And a corner portion of the thick-walled bridge and the thick-walled upper wall of the inside sealing portion is pressed to the drip moulding from the inside of the vehicle. This results in the door being prevented from being drawn outward and the sealing performance between the door weather strip and the drip moulding being increased.

BRIEF EXPLANATION OF THE DRAWINGS

FIG. 2 is a view showing the state of the weather strip before the door is closed;

FIG. 3 is a view showing the state of the weather strip when the door is closed;

FIG. 4 is a view showing the state of the weather strip before the door is closed; and FIG. 5 is a view showing the state of the weather strip when the door is closed.

DETAILED DESCRIPTION OF THE EMBODIMENTS

Figure 1:
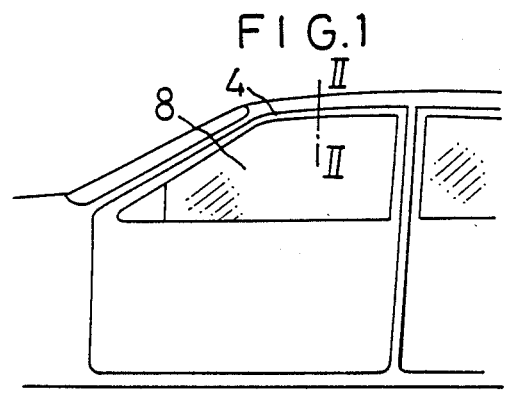
FIG. 1 is a front view of a door of a motor vehicle to which a door weather strip is attached.
Figure 2:
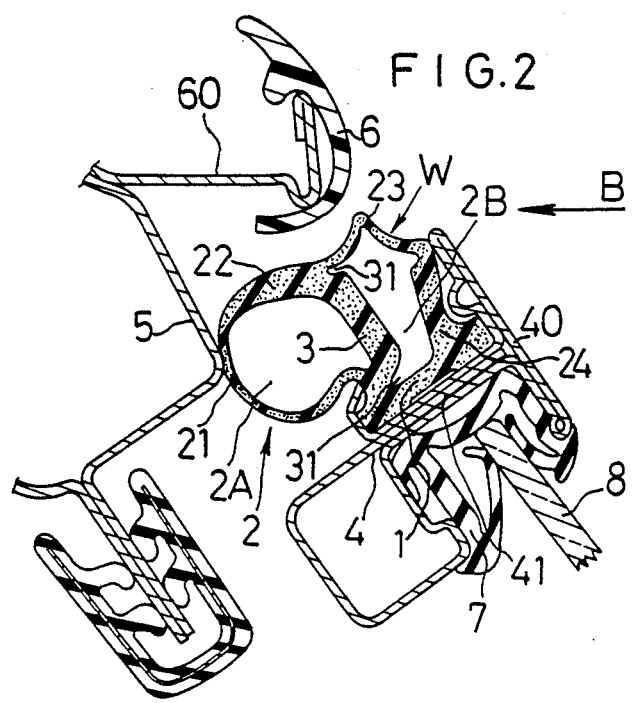
FIGS. 2 and 3 illustrate cross sections of a door weather strip according to the present invention taken along the line II—II of FIG. 1.
Figure 3:
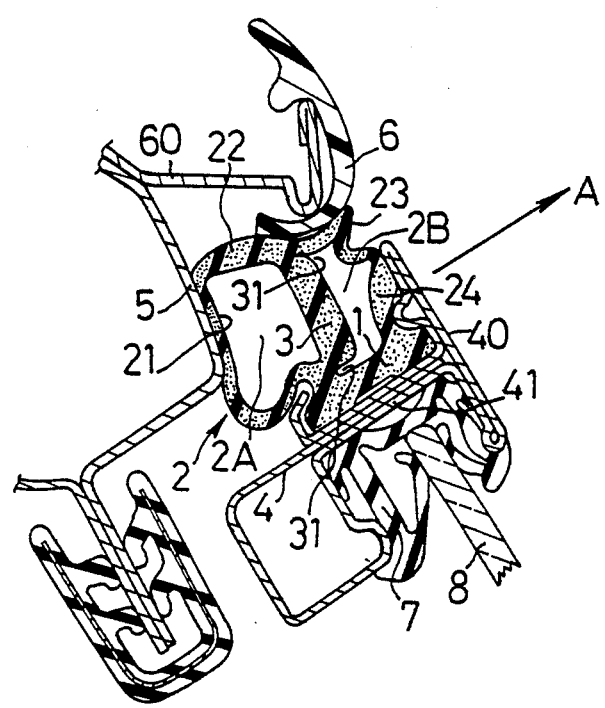

FIGS. 1 through 3 illustrate one embodiment of the present invention.

In the drawings, a door weather strip W is mounted in a retainer 41 integrally formed with an outer periphery of a door frame 4. Reference numeral 7 designates a door glass run mounted in an inner periphery of the door frame 4, and 8 designates a door glass.

FIG. 2 illustrates the state of the door weather strip W before the door is closed, The door weather strip W is an integrally extruded body made of sponge rubber, and is composed of a base portion 1 and a tubular sealing portion 2. Instead, the base portion 1 may be may be made of solid rubber. The thus constructed door weather strip W is held by the retainer 41 in the base portion 1.

The sealing portion 2 is divided into an inside sealing portion 2A and an outside sealing portion 2B by means of a bridge 3 connecting the bae portion 1 and an upper wall of the sealing portion 2. The thickness of the respective bridge 3, upper wall 22 of the inside sealing portion 2A, which extends from an upper end of the bridge 3 inward, and an outer side wall of the outside sealing porion 2B, which extends along a projecting edge 40 of the door frame 4 is made larger than that of the other portion of the sealing portion 2. The inside sealing portion 2A has an arc-shaped expanding side wall 21 on the inside of the vehicle. And an upper wall 23 of the outside sealing portion 2B is bent into the form of a peak. The thickness of both the bridge 3 and the upper wall 22 of the inside sealing portion 2A is made about 2 to 4 times as large as that of the walls 21, 23. At both the upper and lower ends of the bridge 3 are formed inwardly cut grooves 31 in an outside surface thereof.

In the door weather strip W constructed as described above, when the door is closed in a direction of an arrow B(horizontal direction in FIG. 2, as shown in FIG. 3, the side wal 21 of the inside sealing portion 2A is pressed to a body surface 5 formed around a door opening of a vehicle body whereby a reaction force is exerted on the side wall 21 from the body surface 5.

In this case, since the upper wall 22 is undeformably thick, the reaction force from the body surface 5 is undecreasingly transmitted to the upper end of the bridge 3 thereby inclining the bridge 3 outward. This results in the peaked upper wall 23 of the outside sealing member 2B being sandwiched between the upper end of the outward inclined bridge 3 and the projecting edge 40 of the door frame 4, and accordingly being moved upward so as to be pressed to a bottom surface of a drip moulding 6 attached to a drip 60 protruding above the door weather strip W. Thus, a double seal is effected in both the body surface 5 around the door opening and the bottom surface of the drip moulding 6.

During high speed running of the motor vehicle, the door frame 4 is drawn in a direction of an arrow A in FIG. 3. At this time, the corner portion of the upper end of the bridge 3 and the upper wall 22 of the inside sealing portion 2A is pressed to the bottom surface of the drip moulding 6. But, since the bridge 3 and the upper wall 22 are respectively made thick, they are not deformed against the press of the corner portion to the drip moulding 6, thereby operating to prevent the door frame 4 from being drawn outward. Moreover since the pressing force of the corner portion to the drip moulding 6 increases with the increase in outward drawing force, the sealing force of the overall weather strip is further increased.

The fitted state of the door inevitably scatters in each motor vehicle. In the case that the door is fitted excessively close to the drip moulding 6, the upper end of the bridge 3 is liable to come into contact with the drip moulding 6 when the door is closed and opened. In such a case, forces for closing and opening the door are both increased. The increase in above forces can be eased by providing the grooves 31 in both the upper end and the lower end of the bridge 3 to decrease the wall thickness thereof, and accordingly facilitate the inclination of the bridge 3.

Figure 4:
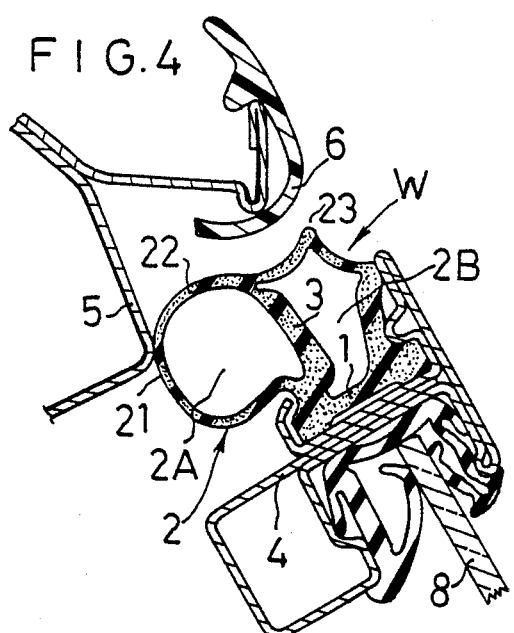
FIGS. 4 and 5 illustrate the cross section of a reference example.
Figure 5:
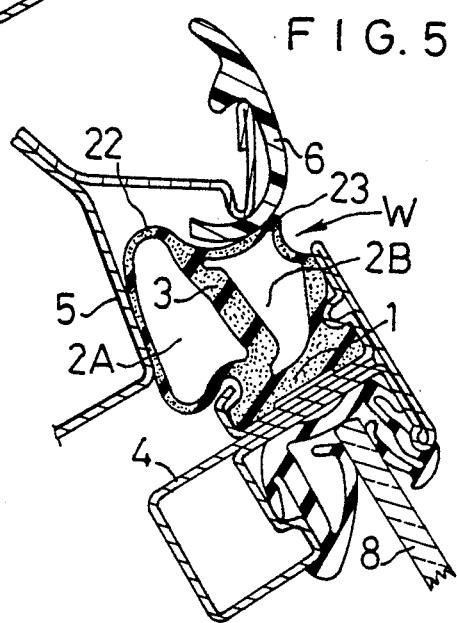

FIGS. 4 and 5 illustrate a reference example. In this reference example, only the bridge 3 is made thick and the upper wall 22 is made to have a thickness equal to that of the other wall of the sealing portion as is different from the preceding embodiment. The other construction of the weather strip of this reference example is substantially the same as that of the preceding embodiment.

When a door is closed, the upper wall 22 of the inside sealing portion 2A of this reference example, rises and curves to absorb a reaction force of the body surface 5 so that the thick-walled bridge 3 is not inclined outward, and accordingly the peaked upper wall 23 of the outside sealing portion 2B is not deformed upward. This results in the peaked upper wall 23 and the drip moulding 6 not coming into contact with each other, and even if coming into contact with each other they only slightly touched to each other, thereby not obtaining sufficient sealing performance.

While the door is repeatedly opened and closed, the upper wall 22 of the inside sealing portion 2A permanently deforms in the rising state. This permanent deformation causes the upper wall 22 to interfere with the drip moulding 6 while opening and closing of the door.

In the door weather strip W according to the present invention, the above described problem can be solved by increasing the wall thickness of both the bridge 3 and the upper wall 22. And a sure double seal can be effected by both the inside sealing portion 2A and the outside sealing portion 2B. Moreover, when the door is drawn outward, the door weather strip W according to the present invention can prevent the drawing of the door and maintain good sealing performance.

What is claimed is:

1. A door weather strip to be attached along an outer periphery of a door frame of a door of a motor vehicle for sealing between a door opening of the motor vehicle and the door frame when the door is closed, comprising:

a base portion to be attached to the outer periphery of the door frame;

a tubular sealing portion integrally formed with said base portion so as to project upwardly therefrom;

a bridge formed between said base portion and an upper wall of said tubular sealing portion for dividing said tubular sealing portion into an inside sealing portion and an outside sealing portion, each having a side wall spaced from said bridge and projecting upwardly from said base portion, the inner side wall of said inside sealing portion being pressed to a body surface formed around the door opening, and upper wall of said outside sealing portion being pressed to another body surface protruding along a roof side of the motor vehicle, the outer side wall of said outside sealing portion being in close contact with a projecting edge of the door frame so that an outward deformation is restrained by said projecting edge, the thickness of both said bridge and an upper wall of said inside sealing portion, which extends from an upper end of said bridge to said inner side wall being made larger than that of the other portion of said sealing portion.

2. The door weather strip according to claim 1, wherein the thickness of said bridge and said upper wall of said inside sealing portion is 2 times to 4 times as large as that of the other portion of said sealing portion.

3. The door weather strip according to claim 2, wherein said bridge is provided with inwardly cut grooves at both an upper end and a lower end so that the wall thickness of said upper end and said lower end is made smaller than that of the other portion of said bridge.

4. The door weather strip according to claim 2, wherein said upper wall of said outside sealing portion has a centrally peaked cross sectional shape.

5. The door weather strip according to claim 1, wherein said door weather strip is made of sponge rubber.

6. The door weather strip according to claim 1, wherein said base portion and said sealing portion including said bridge are made of rubber.

* * * * *